United States Patent [19]
Richardson et al.

[11] Patent Number: 5,818,498
[45] Date of Patent: Oct. 6, 1998

[54] METHOD OF MULTI-CHANNEL THERMAL RECORDING

[75] Inventors: Douglas Richardson, Port Moody; Michel Laberge, Bowen Island, both of Canada

[73] Assignee: Creo Products Inc., Burnaby, Canada

[21] Appl. No.: 543,428

[22] Filed: Oct. 16, 1995

[51] Int. Cl.$^6$ .............................. B41J 2/47; B41J 2/435; G06F 15/00
[52] U.S. Cl. ........................................... 347/237; 395/108
[58] Field of Search ................................. 347/237, 240, 347/130, 200; 358/296, 454, 463; 395/108

[56] References Cited

U.S. PATENT DOCUMENTS

| | | |
|---|---|---|
| 4,743,091 | 5/1988 | Gelbart . |
| 5,164,742 | 11/1992 | Baek . |
| 5,453,777 | 9/1995 | Pensavecchia et al. . |
| 5,522,016 | 5/1996 | Okada et al. ........................... 395/108 |

*Primary Examiner*—N. Le
*Assistant Examiner*—Thinh Nguyen

[57] ABSTRACT

When exposing thermally imageable materials using a multi-channel exposure head, an overlap of at least one channel is used to avoid a visible border at the point where one group of channels, written at the same time, meets a second group of channels. The overlapped area is written twice with identical data.

4 Claims, 2 Drawing Sheets

METHOD OF MULTI-CHANNEL THERMAL RECORDING

BACKGROUND OF THE INVENTION

The invention relates to laser imaging of thermal materials. Thermal materials are materials which respond to the temperature reached rather than to the total number of photons in the exposure. A well known example of a thermal recording material is thermal paper used by many fax machines or materials used in recordable optical discs. When imaging thermal materials with a multi-channel exposure apparatus, such as disclosed by U.S. Pat. No. 5,164,742, the writing conditions of the outermost channels are different than all other channels due to different heat dissipation and different mass flow of the heated material. This difference shows up on the image as a faint but visible line at the border between two groups of channels. One prior art solution to the problem is a multi-channel writing apparatus in which the outermost channels are no different than any other channel, as disclosed in U.S. Pat. No. 4,743,091. In U.S. Pat. No. 4,743,091, all channels are sufficiently separated and interleaved to avoid any interaction between channels. Another solution involves adding two extra outermost channels operated at a constant power in order to equalize the heat flow from the outermost data channels. This is disclosed in U.S. Pat. No. 5,164,742. In this method, the extra two channels are not modulated with data but generate a constant amount of heat, selected to minimize visual artifacts on the image. This solution is only an approximation as it relies on the average value being constant. Other solutions discussed in U.S. Pat. No. 5,164,742 involve writing two adjacent channels with the same data or writing overlapping end channels with data which is a logical AND of the data in the two channels. Both these methods reduce the resolution of the final image as the data written deviates from the correct data.

SUMMARY OF THE INVENTION

According to the present invention, the outermost channels in a group of many channels are being overwritten. At the least, one outermost channel is being fully overwritten. In some cases, two or more channels need to be overwritten for best results. The overwriting uses the same data as the original writing, used either at full power or at a reduced power. Due to the nature of thermal recording, which is activated by reaching a certain temperature, overwriting with the same data at full power does not cause "blooming" as it would in light integrating materials. Areas having reached a certain temperature on the first pass will reach the same temperature (or less, if some material is ablated) on the second pass. The second pass will blend the boundary between groups of channels. The invention will be better understood by studying the preferred embodiment in conjunction with the following drawings.

DESCRIPTION OF THE PREFERRED EMBODIMENT

Figure 1:
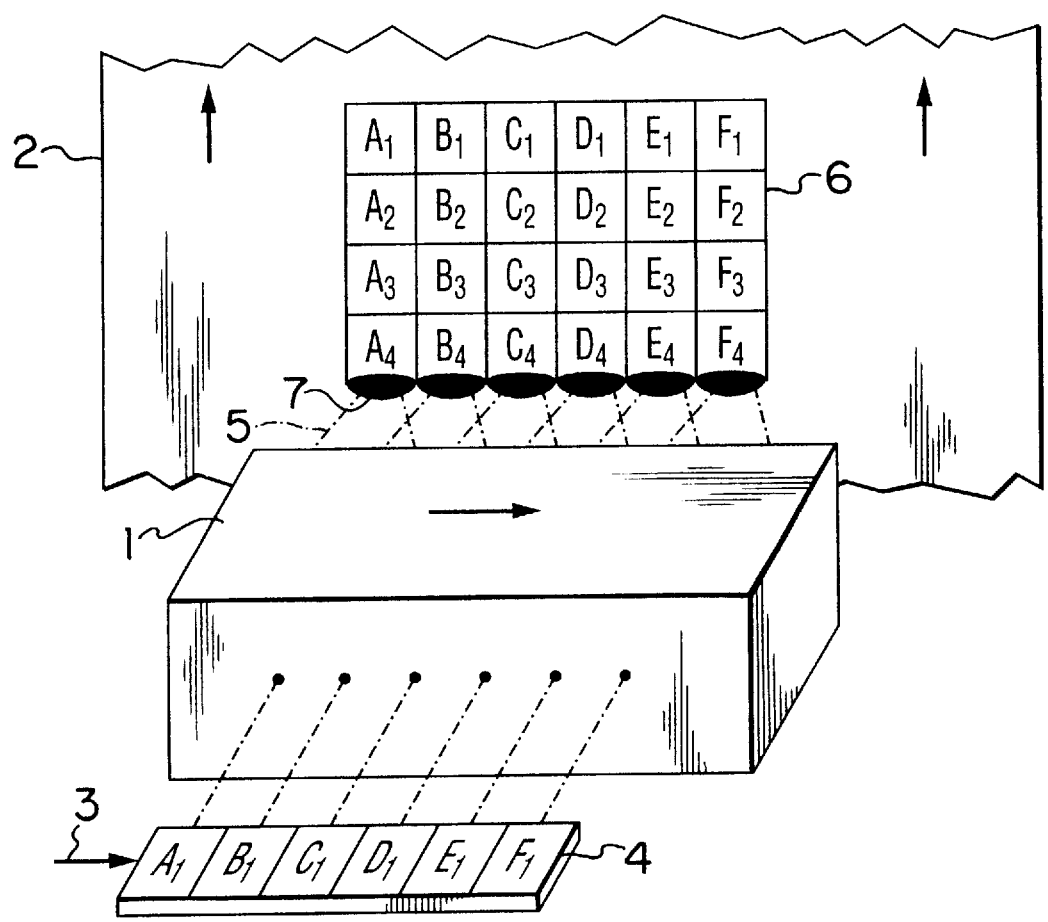
FIG. 1 shows a group of channels being recorded on a thermally sensitive material using a multi-channel laser head.
Figure 2:
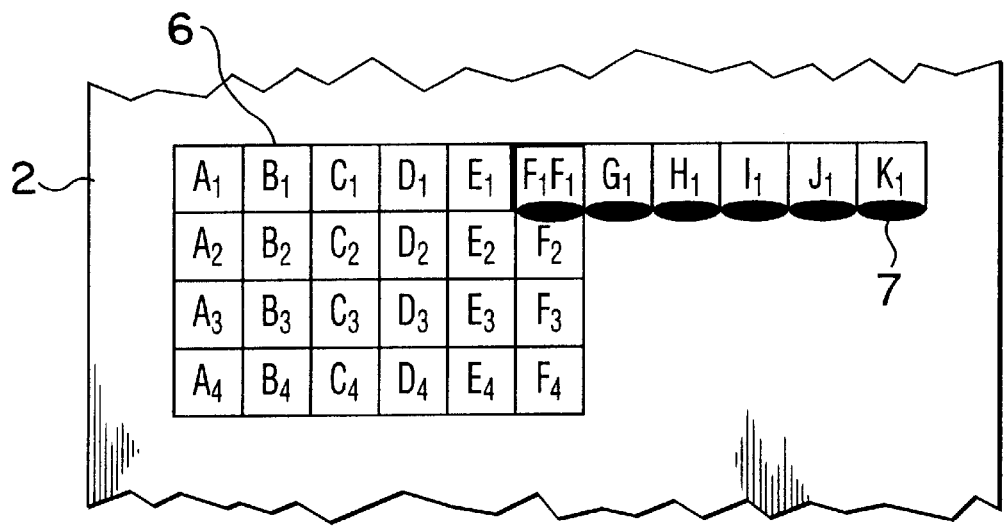
FIG. 2 shows the recording of the second group of channels, with the outermost channels being overwritten with the same data.
Figure 3:
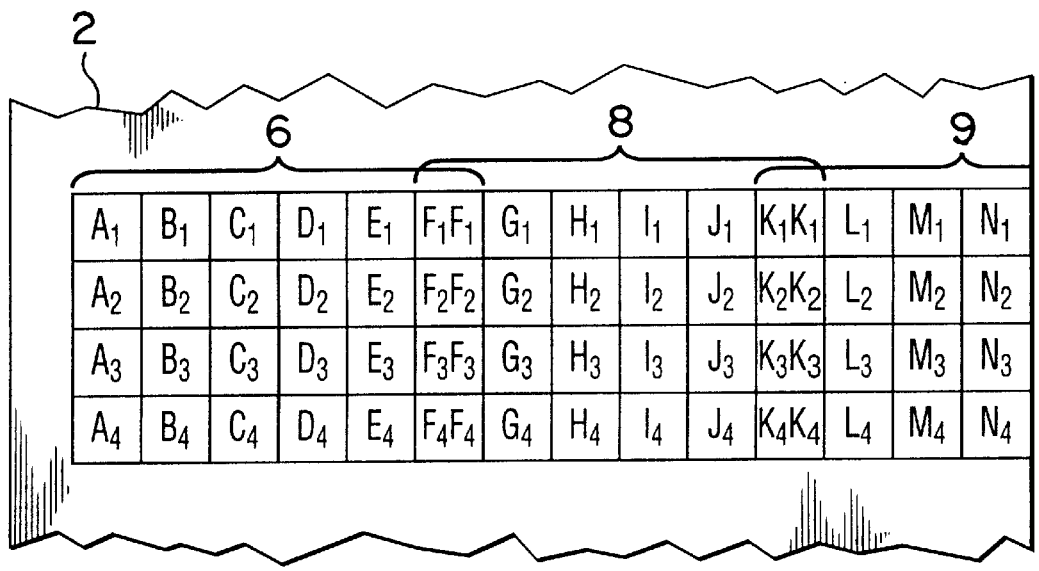
FIG. 3 shows the completed multi-channel image.

Referring now to FIG. 1, a multi-channel laser imaging head 1 is exposing an imaging material 2 with an array of laser spots 7 created by laser beams 5 according to data 3 which is organized by data organizer 11 and shifted into the imaging head 1 via shift register 4. Image scanning is achieved by creating relative motion between head 1 and material 2 in two dimensions. Details of means of creating this relative motion are well known in the art and need not be detailed here. By the way of example, material 2 can be wrapped around a rotating drum and head 1 can be translated along axis of the drum using a track and lead screw. The head 1 and means of creating relative motion are readily available commercial technology. After a complete multi-channel strip has been written, the head 1 has to be translated relative to material 2 in order to expose the next strip. By way of example, imaging head 1 may be transported by array mover 10. As an illustration, assume each written multi-channel strip needs to be five pixels long and the data recorded in the first strip is imaged by a six channel head, carrying data A, B, C, D, E, F. When the next strip is to be recorded, the relative motion between head 1 and material 2 is chosen to be less than six pixels but still an integer number of pixels. In FIG. 2, by the way of example, head 1 (not shown) was translated by only five pixels causing an overlap of one pixel between laser spots 7 and previously written image 6. The first channel is loaded with the same information as the last channel of the previous strip. Since the data is normally read out from a computer memory, the overlap simply means reading out the overlap data (F in FIG. 2) twice. The subscripts $F_1$; $F_2$; $F_3$ etc. refer to sequential steps in time. As a result of this, column F will be written twice with the same data. The same will happen on every new strip, as shown by columns F and K in FIG. 3. If the exposed material 2 was an integrating material, such a silver-halide film, the intensity of the laser beams writing columns F and K would have to be reduced to one half in order for the total exposure to be identical to other columns. In case of thermal materials, the exposure can be left full as any material heated by the first exposure will be heated again, to the same or lower temperature, by the second exposure and the result will not change. The reason for the lower temperature on the second exposure is that some of the laser absorbing material has already been ablated or transformed. Due to this mechanism, the exact control of the laser power in the overlapping area is not critical and material left behind unexposed by the first exposure will be exposed by the second exposure, blending together the strips 6,8,9 in FIG. 3 without forming a visible line at the boundary. Even better blending is achieved when the overlap is 2 channels, as in this case the one channel before the test is already identical to any other channel as it is surrounded by two writing channels It is obvious that this invention is not limited to an overlap on only a single pixel. Any number of channels can be overlapped, however, tests have shown that there is no benefit beyond a two pixel overlap.

What is claimed is:

1. A method for reducing visible exposure differences between adjacent sets of pixels recorded on a thermally sensitive recording medium using a multi-channel laser imaging system having K lasers, the method comprising the steps of:
   (a) transporting the thermally sensitive recording medium in a first direction;
   (b) writing a first set of K pixels on the thermally sensitive recording medium based upon a first group of data;
   (c) transporting said laser imaging system in a second direction perpendicular to said first direction to a position in which N of said K lasers overlaps and registers with at least N pixels of said first set of pixels, where N is less than K; and (d) writing a second set of K pixels based upon a second group of data in which information used to control the N overlapping lasers is identical to information used to write the N pixels of said first set of pixels in step (b).

2. A method according to claim 1, wherein N is equal to one.

3. A method according to claim 1, wherein N is equal to two.

4. A method according to claim 1, wherein said first and second set of K pixels are written on the thermally sensitive recording medium in said second direction.

* * * * *